(12) United States Patent
Couturier et al.

(10) Patent No.: US 9,322,576 B2
(45) Date of Patent: Apr. 26, 2016

(54) RECEIVER MODULE FOR SOLAR POWER STATION WITH IN-BUILT THERMAL MONITORING

(75) Inventors: Raphael Couturier, Sassenage (FR); Arnaud Bruch, Saint Colombe (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 368 days.

(21) Appl. No.: 14/005,155

(22) PCT Filed: Mar. 13, 2012

(86) PCT No.: PCT/EP2012/054312
§ 371 (c)(1),
(2), (4) Date: Sep. 13, 2013

(87) PCT Pub. No.: WO2012/123433
PCT Pub. Date: Sep. 20, 2012

(65) Prior Publication Data
US 2014/0000581 A1    Jan. 2, 2014

(30) Foreign Application Priority Data

Mar. 14, 2011    (FR) ...................................... 11 50257

(51) Int. Cl.
*F24J 2/46*    (2006.01)
*F24J 2/38*    (2014.01)
(Continued)

(52) U.S. Cl.
CPC .... *F24J 2/38* (2013.01); *F24J 2/07* (2013.01); *F24J 2/16* (2013.01); *F24J 2/402* (2013.01);
(Continued)

(58) Field of Classification Search
CPC ................... F24J 2/38; F24J 2/10; F24J 2/46

USPC .................................. 126/597, 704, 714, 692
See application file for complete search history.

(56) References Cited

U.S. PATENT DOCUMENTS

| | | | | |
|---|---|---|---|---|
| 4,505,260 A | * | 3/1985 | Metzger ..................... | F24J 2/06 126/637 |
| 5,365,920 A | * | 11/1994 | Lechner ................... | F24J 2/145 126/600 |

(Continued)

FOREIGN PATENT DOCUMENTS

| | | |
|---|---|---|
| DE | 25 11 740 A1 | 9/1976 |
| DE | 10 2008 039 692 A1 | 3/2010 |

(Continued)

OTHER PUBLICATIONS

French Preliminary Search Report issued Dec. 7, 2011, in French Patent Application No. 1152057 with English translation of category of cited documents.

(Continued)

*Primary Examiner* — Gregory Huson
*Assistant Examiner* — Nikhil Mashruwala
(74) *Attorney, Agent, or Firm* — Oblon, McClelland, Maier & Neustadt, L.L.P.

(57) ABSTRACT

A receiver module for a solar power station receiver, including a metal structure and an absorber module, the metal structure defining a cavity extending along a longitudinal axis in a base of which the absorber module is housed. The cavity includes an aperture configured to be aligned towards at least one mirror of the solar power station, the aperture is edged by two side portions of the metal structure extending longitudinally on either side of the cavity. The receiver module also includes thermocouples positioned on each of the side portions relative to the longitudinal axis to detect a temperature difference between a reference temperature and two points of the metal structure that are opposite relative to the longitudinal axis.

16 Claims, 4 Drawing Sheets

Figure 1:
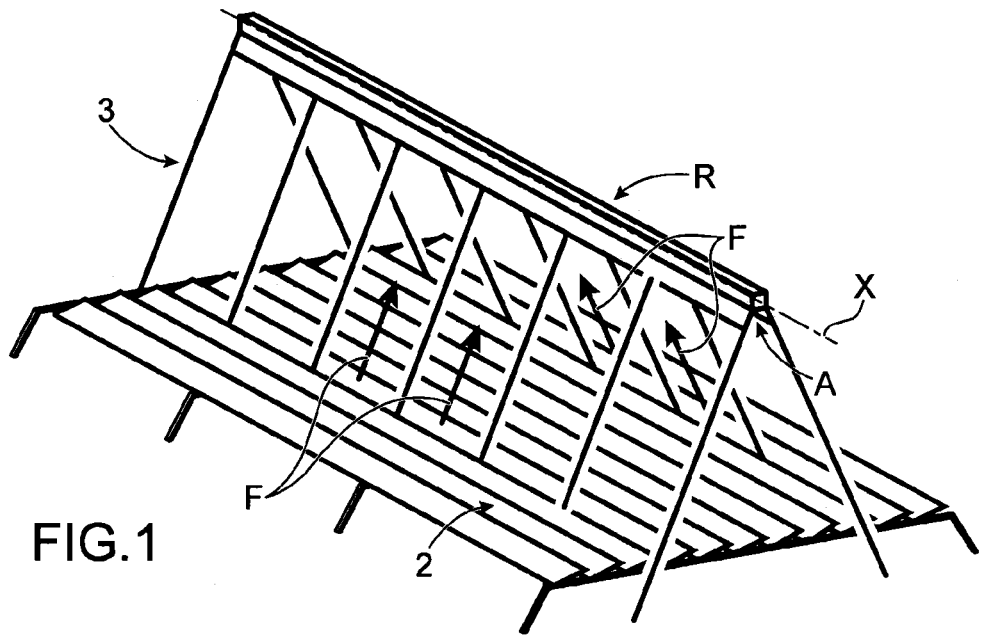

(51) Int. Cl.
    *F24J 2/07*    (2006.01)
    *F24J 2/16*    (2006.01)
    *F24J 2/40*    (2006.01)
    *F24J 2/10*    (2006.01)

(52) U.S. Cl.
    CPC .......... *F24J 2/4621* (2013.01); *F24J 2002/108* (2013.01); *F24J 2002/385* (2013.01); *Y02E 10/41* (2013.01); *Y02E 10/47* (2013.01)

(56) References Cited

U.S. PATENT DOCUMENTS

| | | | | |
|---|---|---|---|---|
| 5,465,708 | A | * | 11/1995 | Goebel ............... F03G 6/06 126/635 |
| 6,442,937 | B1 | | 9/2002 | Stone et al. |
| 7,992,553 | B2 | * | 8/2011 | Le Lievre ............... F24J 2/07 126/569 |
| 8,807,128 | B2 | * | 8/2014 | Mills ............... F24J 2/07 126/569 |
| 2009/0000613 | A1 | | 1/2009 | Edwards et al. |
| 2009/0056703 | A1 | | 3/2009 | Mills et al. |
| 2009/0084374 | A1 | | 4/2009 | Mills et al. |
| 2010/0078011 | A1 | | 4/2010 | Feher |
| 2011/0180059 | A1 | | 7/2011 | Selig et al. |
| 2013/0118479 | A1 | | 5/2013 | Fourmigue et al. |
| 2013/0125873 | A1 | | 5/2013 | Pra et al. |
| 2013/0152917 | A1 | | 6/2013 | Couturier et al. |
| 2014/0000581 | A1 | | 1/2014 | Couturier et al. |
| 2014/0109893 | A1 | | 4/2014 | Couturier et al. |

FOREIGN PATENT DOCUMENTS

| | | |
|---|---|---|
| EP | 2 161 516 A1 | 3/2010 |
| WO | WO 03/010471 A1 | 2/2003 |
| WO | WO 2010/025808 A2 | 3/2010 |

OTHER PUBLICATIONS

Rolf Bernhard, et al., "Linear Fresnel Collector Demonstration on The PSA Part II—Commissioning and First Performnce Tests", (2008). In: 14$^{th}$ International Symposium on Concentrated Solar Power and Chemical Energy Technologies. 8 pages.

Anna Heimsath, et al., "Characterization of Optical Components for Linear Fresnel Collectors by Fringe Reflection Method", 2008, Proceedings of Solar Paces 2008, 8 pages.

International Search Report issued May 7, 2012, in PCT/EP2012/054312.

* cited by examiner

RECEIVER MODULE FOR SOLAR POWER STATION WITH IN-BUILT THERMAL MONITORING

TECHNICAL FIELD AND PRIOR ART

The present invention relates to a solar receiver module for a solar power station with integrated thermal monitoring, to a solar receiver comprising at least two such receiver modules, and to a concentrating solar power station of the Fresnel type comprising at least one such receiver.

Concentrating thermal solar technology consists in using solar radiation to heat a heat transfer fluid used as the heat source in a thermodynamic cycle. Concentration enables relatively high temperatures to be attained, and thus relatively substantial thermodynamic conversion efficiencies to be enjoyed. The developed technologies are distinguished by the means used to concentrate the solar rays, by the means by which heat is transferred, and possibly by the means used to store heat, i.e. the heat transfer fluid used and thermodynamic conversion means which are, for example, steam turbines, gas turbines or Stirling engines.

There are typically four families of Concentrating Solar Power (CSP) systems:
 linear-focus parabolic cylinder collectors,
 Fresnel linear concentrators,
 central receiver tower systems, and
 adjustable-focus parabolas.

Each concentrating solar power system comprises a solar receiver the function of which is to transfer to a fluid, such as water, oil or a gas, the heat of the solar radiation. This solar receiver therefore forms a heat exchanger. This exchanger is formed of one or more tubes installed parallel to one another, in which the heat transfer fluid flows.

In the particular case of a Fresnel-type concentrating solar power plant, the solar receiver receives the light rays reflected by mirrors, and transmits them to the heat transfer fluid in the form of heat.

A solar receiver typically comprises:
 an absorber which receives the solar flux on its lower face, and in which flows the heat transfer fluid, for example oil or steam,
 possibly, a layer of thermal insulating material enabling the heat losses from the absorber to the exterior to be limited,
 possibly, a glazed panel enabling the absorber to be insulated from the external environment, and delimiting a closed cavity between the absorber and the glass.

The solar receiver is suspended by a metal structure above the mirrors.

The absorber may be formed from a single tube in which a heat transfer fluid flows, or then from several adjacent tubes.

It is possible that the solar flux reflected by the mirrors may not be correctly aligned and/or focused relative to the absorber, and the concentrated solar patch may then illuminate a portion of the metal structure, instead of illuminating only the absorber.

In addition to the fact that a portion of the reflected flux is not transmitted to the heat transfer fluid and is consequently lost, the metal structure is heated. It is estimated that a temperature rise of 300° C. of the metal structure could occur. In a steel structure such a temperature rise produces an expansion of the order of 5 mm/m. When the solar radiation is reduced or disappears, for example in the evening or when clouds pass overhead, the temperature of the metal structure is reduced. The structure is then subject to thermal cycles which may cause permanent deformations and damage to the structure.

In normal operation the metal structure has an operating temperature typically of between 50° C. and 350° C., this temperature depending on the heat transfer fluid used.

Document WO 2001/025808 describes such a solar receiver fitted with a robot intended to measure the distribution of the density of the solar radiation aligned towards the absorber, and thus to check whether the reflectors of the installation are correctly positioned.

This robot moves over the receiver and along it. This device is complex and bulky, requires substantial maintenance, and gives no information on the metal structure.

In addition, this device does not enable a problem of focusing and/or mirrors to be detected dynamically during operation.

DESCRIPTION OF THE INVENTION

One aim of the present invention is consequently to provide a solar receiver of simple and robust construction, in which an alignment fault and/or a fault of focusing of the solar flux on the absorber may easily be detected.

The stated aim is attained by a solar receiver having a metal structure, at least one absorber supported by the metal structure and means positioned in the metal structure to detect a temperature difference compared to a reference temperature for this structure. This temperature difference is representative of a positioning fault and/or fault of focusing of the solar flux on the absorber.

In other words, a positioning and/or focusing fault of the concentrated solar patch by the appearance of a temperature difference of the metal structure, in proximity to the absorber, compared to its temperature in an optimum operating condition, in which the solar patch illuminates only the absorber, is detected.

By virtue of the invention, the detection of the appearance of a temperature difference at the edges of the structure around the cavity enables qualitative information to be obtained concerning the type of fault which the flux has: either it is aligned too much to the left relative to the absorber, or it is aligned too much to the right relative to the absorber and/or it is diffuse. The thermal changes of the structure and the general operation of the power station may therefore be monitored without having quantitative data concerning the flux, but solely by having available qualitative data concerning its state of alignment/focusing and/or of diffusion. This detection is also obtained in a very simple and very reliable manner.

Advantageously, knowledge of the value of the temperature difference may enable even more thorough monitoring of the power station to be undertaken.

For example, simple thermocouples distributed along the metal structure either side of the absorber are implemented. They are for example in pairs, where each pair measures the temperature of the left and right portions of the structure in a plane orthogonal to the axis of the receiver.

The mirrors are generally distributed into groups throughout the length of the power station, and each group is aligned by a single actuator, such that the mirrors of a group form a monolithic assembly. The choice may then be made to detect a difference of temperature, to the left or to the right of the absorber, in a single location of a section of the metal structure of the receiver which is illuminated by a group of mirrors, since the alignment of the mirrors cannot be corrected individually unless direct each mirror is acted upon manually.

The intervals of the detection means and those of the groups of mirrors are preferably staggered.

The subject-matter of the present invention is then a receiver module for a solar power station, where said receiver module comprises a metal structure and an absorber module, where the metal structure defines a cavity at the base of which the absorber module is housed, where said cavity has an aperture configured to be aligned towards at least one mirror of the solar power station, where said aperture is edged by at least one side portion of the metal structure, where the receiver module also comprises means positioned on said at least one side portion to detect at least one temperature difference between a reference temperature and a first point of the side portion, and a temperature difference between a reference temperature and a second point of the side portion, where said first and second points of the side portion are opposite one another relative to a plane of symmetry of the cavity.

In an example embodiment in which the receiver module has a longitudinal axis and the cavity extends along the longitudinal axis, said metal structure may comprise two side portions extending longitudinally either side of the cavity, where both measurement points are positioned on each of the side portions relative to the longitudinal axis, and where advantageously both points are contained in a plane orthogonal to the longitudinal axis.

Advantageously, the detection means comprise at least two thermocouples, where each of the at least two thermocouples is installed on said at least one side portion of the metal structure.

The detection means are preferably installed on said at least one side portion of the metal structure on the face opposite the one configured to be aligned towards the mirrors.

The absorber module may comprise at least two adjacent pipes extending longitudinally.

In one embodiment the receiver module may comprise an internal metal plate folded so as to form said cavity of longitudinal axis, where two angles, each attached to the side edges of the internal metal plate, form the side portions, with at least two metal elements forming an arc of a circle attached to each of the longitudinal ends of the angles and surrounding the internal metal plate opposite the aperture of the cavity, and an external cover in the form of half-tube attached to the elements forming an arc of a circle.

Another subject-matter of the present invention is a receiver comprising at least two receiver modules according to the present invention, placed end-to-end and connected to one another, where the absorber modules are attached in sealed fashion.

The detection means are preferably distributed along the entire length of the receiver so as to allow complete monitoring of the receiver.

Another subject-matter of the present invention is a solar power station comprising at least one receiver according to the present invention, a frame to suspend said receiver, mirrors positioned under the receiver such that the mirrors reflect a solar flux on to the absorber, where said mirrors can be aligned relative to the receiver, at least one actuator to move the mirrors and one control unit for controlling said at least one actuator.

The receiver may have a longitudinal axis and the mirrors may then be distributed in groups along the axis, where the same alignment is imposed on all the mirrors of a given group, and where each group comprises at least one actuator controlled independently of the actuators of the other groups.

The receiver advantageously comprises as many detection means as there are groups of mirrors, where said detection means are positioned on the side portions of the metal structure at an interval which is staggered relative to that of the groups of mirrors.

When a temperature difference is detected which is higher than a threshold value, for a given group of mirrors, the control unit may determine, in accordance with the actual alignment of said mirror and of the alignment of the sun at the time when the temperature difference is detected, a correction angle for said group of mirrors, and may control the at least one actuator of the group of mirrors, causing it to pivot through the determined correction angle, and may then check the effect of said rotation on the temperature difference.

Another subject-matter of the present invention is a method for monitoring a solar power station according to the present invention, comprising the following steps:

a) measurement of the temperature differences along the length of the receiver, and comparison with a threshold value, b) when one or more temperature difference(s) is/are greater than the given value, determination of a correction angle for the mirror or mirrors concerned, c) modification of the angle of alignment of the mirror or mirrors concerned in accordance with the calculated correction angle, d) verification of the effect of the modification, e) if the temperature difference for one or more mirrors concerned is greater than the threshold value, steps b), c) and d) are repeated; otherwise step a) is repeated.

Step d) takes place, for example, several hours or one day after step c).

If after several corrections the temperature difference is still greater than the threshold value, an individual action may be undertaken on the mirrors, and/or measures may be taken to protect said structure relative to the solar flux.

The threshold value is, for example, equal to 10° C.

BRIEF DESCRIPTION OF THE ILLUSTRATIONS

Figure 2:
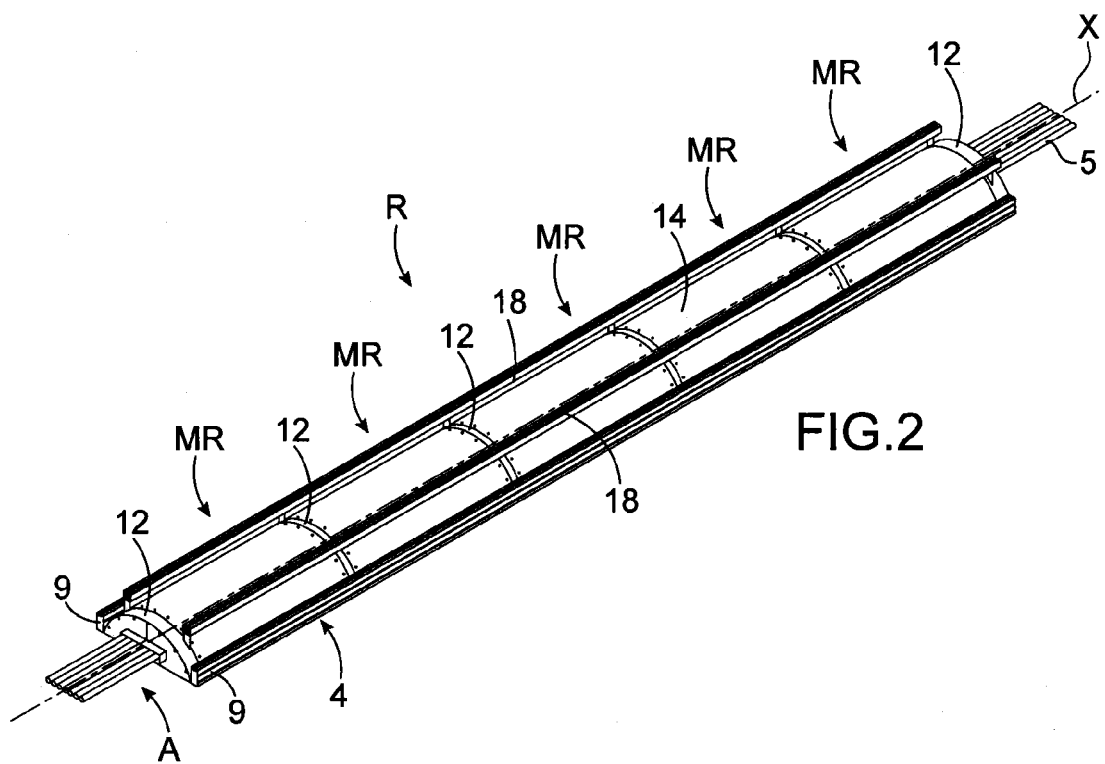
Figure 3A:
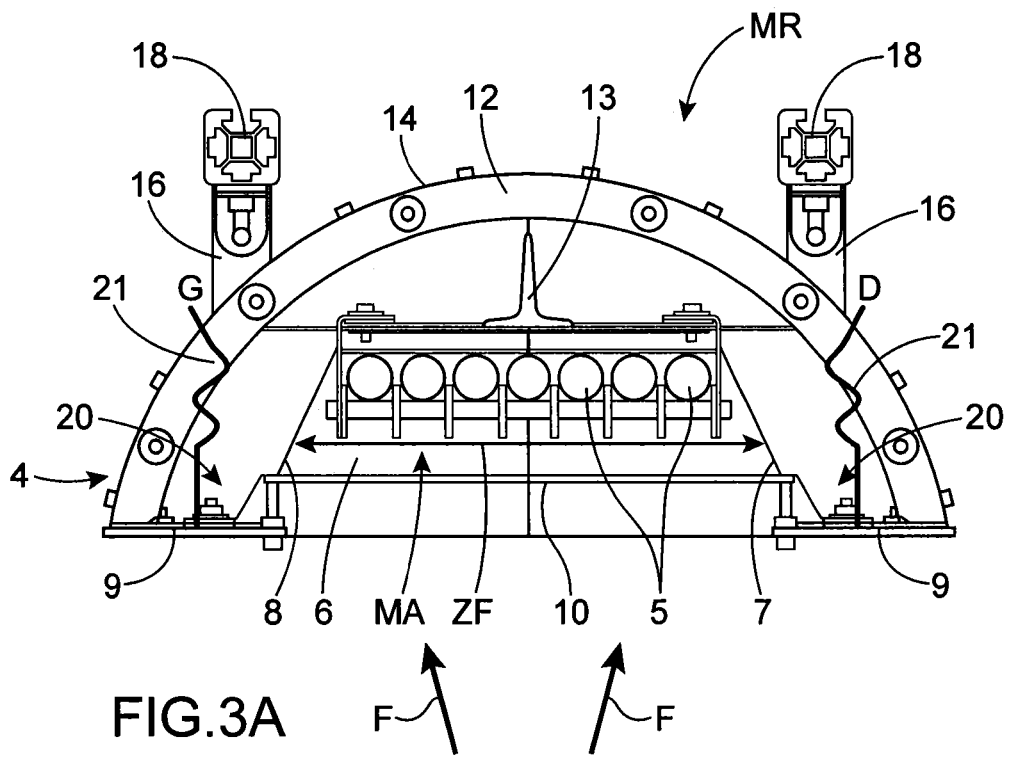
Figure 3B:
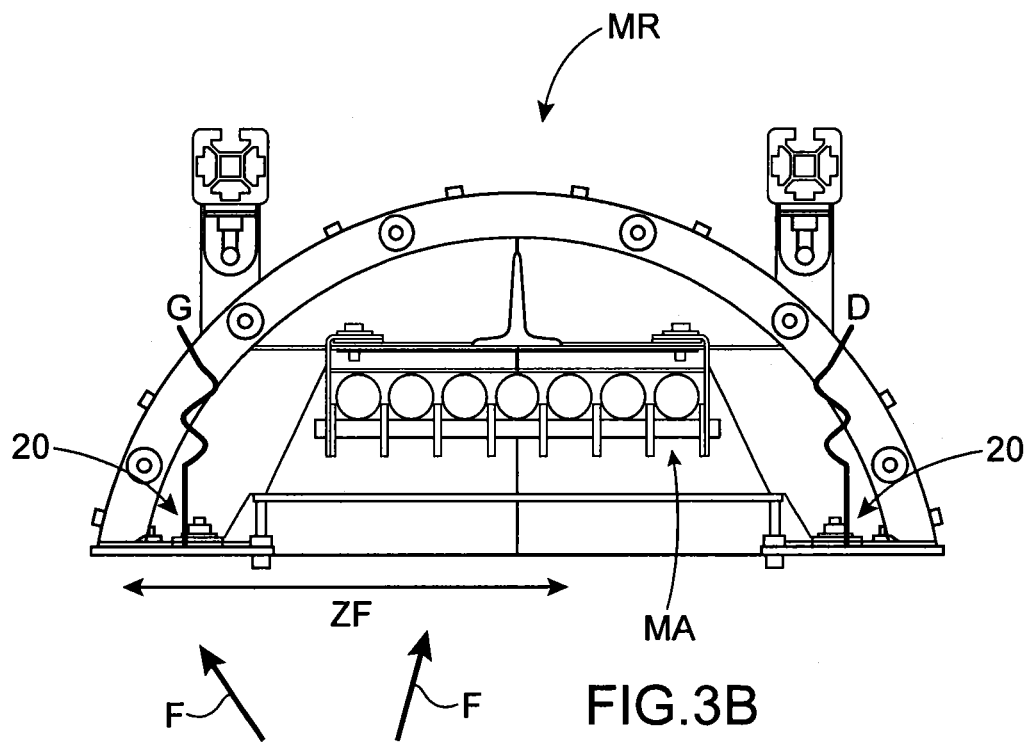
Figure 3C:
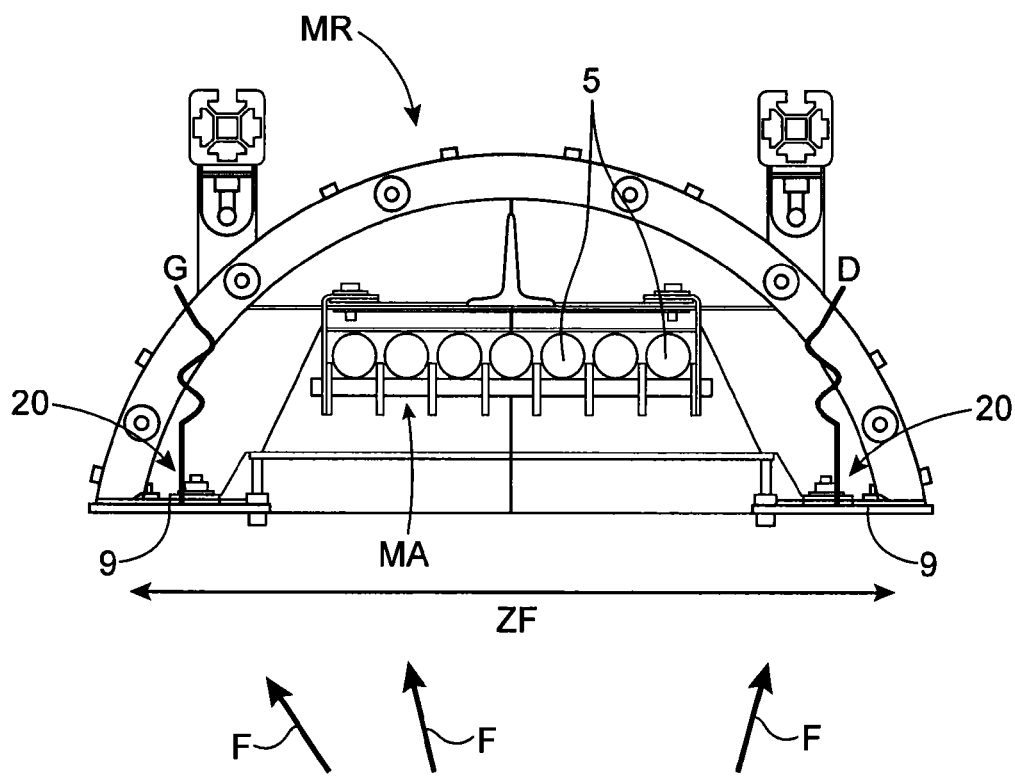
Figure 4:
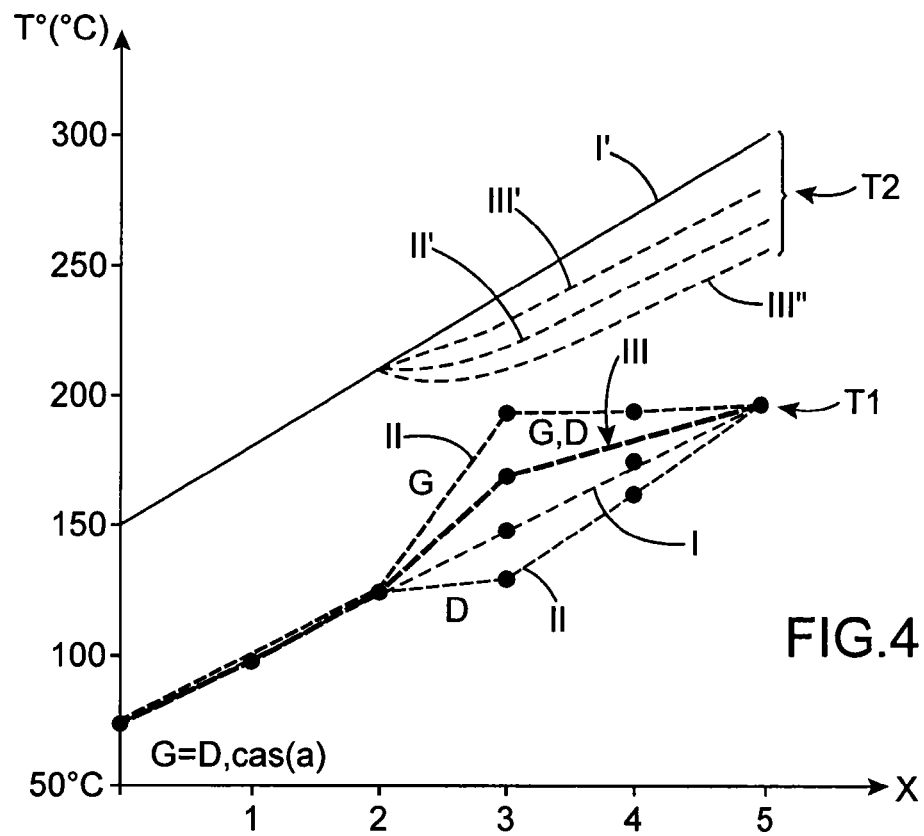

The present invention will be better understood by means of the description which follows and the appended illustrations, in which:

FIG. 1 is a schematic representation of a concentrating solar power station of the "Fresnel" type, FIG. 2 is a perspective view of an example of a receiver according to the present invention, FIGS. 3A to 3C are transverse section views of the receiver of FIG. 2, in which are represented the different operational states of the receiver which may be detected by virtue of the present invention, FIG. 4 is a graphic representation of the variation in temperature of the metal structure along the longitudinal axis of the receiver, and of the temperature variation of the heat transfer fluid along the longitudinal axis, for the different states of FIGS. 3A to 3C, FIG. 5 is an identical view to that of FIG. 2, in which the thermocouples are identified along the receiver.

DETAILED DESCRIPTION OF PARTICULAR EMBODIMENTS

In FIG. 1 a diagram may be seen of a concentrating solar power station of the "Fresnel" type to which the invention applies.

The solar power station comprises a receiver R, mirrors 2 to reflect the solar rays towards the absorber, a system for supplying the receiver with a "cold" heat transfer fluid, a system for collecting "hot" heat transfer fluid at the outlet of the receiver, and thermodynamic conversion means (not represented) which comprise, for example, steam turbines, gas turbines, etc. The power station and the solar receiver extend along a longitudinal axis X.

The solar receiver is suspended above mirrors 2. These mirrors reflect the solar radiation in the direction of solar receiver R, and more specifically in the direction of an absorber A. Mirrors 2 can be aligned relative to the ground such that they can align solar flux F in the direction of the receiver. For example, several mirrors are coupled together and are moved together, forming a monolithic assembly. The mirrors are able to rotate around an axis parallel to the axis of the receiver.

The receiver consists of multiple receiver modules connected to one another along longitudinal axis X. For example, these may be modules measuring 5 meters in length.

The receiver is suspended above the mirrors through a means 3, in the represented this is a frame 3, measuring, for example, between 7 m and 15 m in height.

In FIGS. 2 and 3A to 3C an example embodiment of a receiver consisting of several receiver modules MR can be seen in detail. In FIG. 2 the receiver comprises 5 receiver modules.

In the remainder of the description we shall describe a receiver module.

Receiver module R comprises an absorber module A and a support structure 4 for supporting the absorber.

Supporting structure 4 is metal and is configured to enable the receiver to be suspended from the frame.

In the represented example each absorber module is formed from several pipes 5 in which a heat transfer fluid is intended to flow; the pipes are positioned side-by-side in the longitudinal direction. Pipes 5 of the successive absorber modules are connected end-to-end in sealed fashion.

Receiver module MR comprises a cavity 6 the aperture of which is aligned towards mirrors 2 and housing absorber module MA which is attached to the base of cavity 6.

Cavity 6 is delimited by a folded internal metal plate 7, delimiting a cavity of a longitudinal axis X with a trapezoid section. Seen with a transverse section (FIG. 3A to 3C), metal plate 7 forms a side skirt 8 which advantageously redirects the luminous flux originating from mirrors 2 on to absorber module MA. The luminous flux is represented symbolically by arrows F.

A glass pane 10 preferably closes the cavity and isolates the absorber module from the external environment.

Angles 9 extend longitudinally either side of internal plate 7 and are attached to it, for example by means of screw-nut assemblies. Angles 9 are used to rigidify the structure.

Support structure 4 also comprises metal elements 12 forming an arc of a circle, for example two such, positioned at each of the longitudinal ends of the internal plate to rigidify it, and a beam 13 with a T-shaped section which is attached along the entire length of the internal plate on one face of the plate opposite the face to which the absorber is attached.

Elements 12 comprise at each end a tab 12.1 intended for attaching to angles 9, for example by screw-nut assemblies.

An external plate 14 with a half-cylinder shape extends between the two elements 12 and is attached to them.

Elements 12 advantageously comprise rings 16 for handling the receiver module and suspending it from the frame.

Means 20 for detecting a temperature difference 20 relative to a reference temperature are comprised on the angles, and more generally on the portions of the metal structure surrounding the cavity. In the representation of FIGS. 3A to 3C, measuring means 20 are positioned to the left and to the right of cavity 6.

Detection means 20 are advantageously attached to an internal face of angles 9, and not to an external face, in order that they are not illuminated by the heat flux. Means 20 are also advantageously positioned in direct contact with the angles.

In the example represented in FIGS. 3A to 3C a connection thread 21 is represented schematically. For practical reasons the connection wires are integrated in the metal structure.

In addition, the measurements are not necessarily transmitted by wired means, but could be transmitted by radio means, for example in the case of large solar power stations.

The detection means are distributed along the angles.

Means 20 are formed, for example, by thermocouples in contact with angle 9. Temperature is detected by the conduction of heat through the metal plate of the angles, which offers satisfactory measuring reliability in comparison with a measurement directly on the illuminated face of the angles.

Indeed, if the thermocouple receives the concentrated solar flux directly, the temperature measured by the thermocouple is in fact the expression of the absorption and emission properties of the metal sheath protecting the thermocouple.

Thermocouples have the advantage that they are very simple and very robust temperature sensors, with a low cost price. They can also be installed easily on the metal structure, and do not disrupt the operation of the solar field, and the transfer of heat to the heat transfer fluid.

As a variant, measurements by infrared camera or by Bragg networks photoinscribed in optical fibres might be envisaged.

Measuring means 20 are such that they enable a temperature difference of the metal structure either side of the absorber to be known. For example, pairs of thermocouples are implemented. The thermocouples in a pair are positioned either side of the cavity, and are preferably located roughly in the same plane orthogonal to the longitudinal axis. As a variant, the two thermocouples may be in two separate planes.

The number of pairs of thermocouples may advantageously be small, since the mirrors are generally moved in groups, and not individually, as was described above.

The groups of mirrors may also be constituted by mirrors located either side of axis X, or alternatively on the same side. Consequently, it is possible to use only a single pair of thermocouples in a section of receiver illuminated by a given group of mirrors. A group of mirrors measures, for example, between 44 m and 50 m in length. If it is supposed that the alignment of the mirrors of a group is identical, there is no need to have information on the temperature at all points of the structure. If the mirrors have an alignment defect, this poor alignment may be detected, whatever the point of the zone illuminated by the group of mirrors.

However, several pairs of thermocouples may be used in each section of receiver illuminated by a single group of mirrors, in order to detect a focusing and/or positioning fault of a mirror or of several mirrors in the group. This fault may be a fault of adjustment during assembly, or a broken mirror.

A local inspection is thus undertaken. In this case a correction is made to one or more mirrors, and not to the group.

An interval between two pairs of successive thermocouples of several meters, for example 10 m to 25 m, may be chosen. In the case of a receiver which is 1 km in length, 80 thermocouples are used, corresponding to a power rating of 0.5 MWe.

Figure 5:
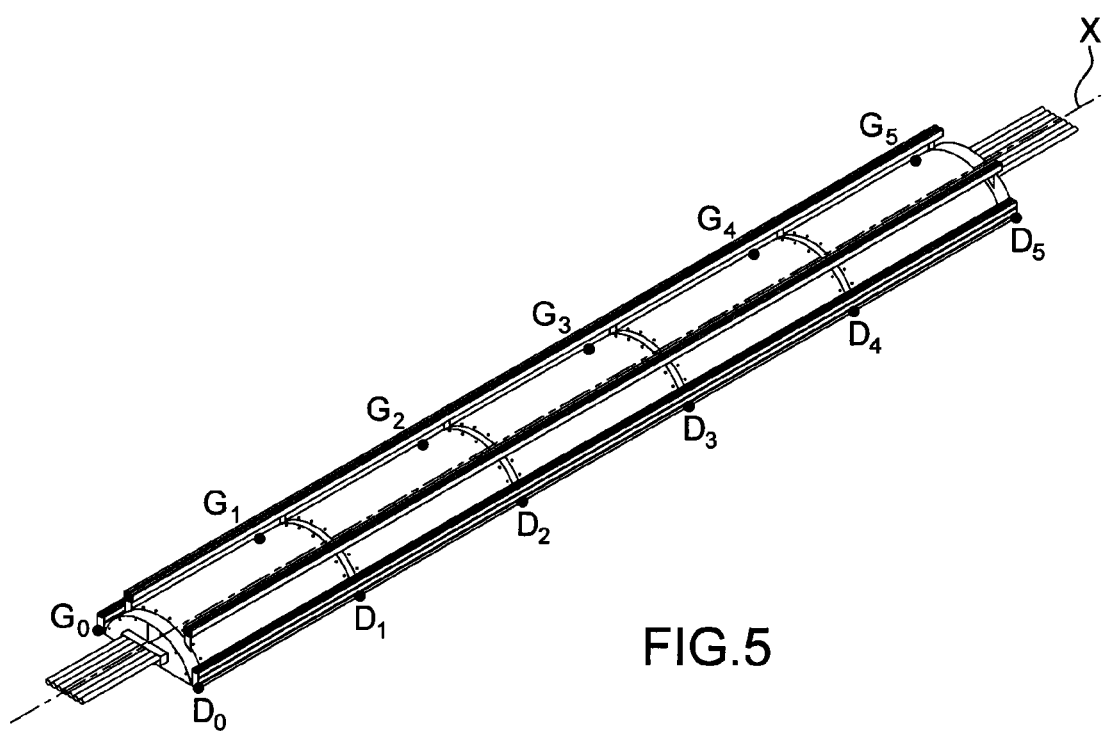

In FIGS. 3A to 3C three states of illumination of the receiver are represented. In FIG. 4 the temperature of metal structure T1 and temperature T2 of the heat transfer fluid in the absorber are represented as a function of the position of the thermocouples on the receiver along the longitudinal axis. In FIG. 5 the positioning and designation of the thermocouples may be seen; the thermocouples are designated by G or D depending on whether they are positioned to the left or to the right, respectively, either side of the axis, and by 0 to 5 depending on their position along longitudinal axis X.

In the represented example the receiver is 50 m in length and thermocouples 20 are positioned every 10 m along it. The hypothesis of a heat transfer fluid entering at 150° C. and heating by 2° C. to 5° C. approximately every meter is used.

The area of the receiver illuminated by the concentrated flux, which is equal to the extent of the solar patch, is represented by a double arrow ZF.

In FIG. 3A the flux is correctly focused, area ZF is centred on absorber A and only the absorber is illuminated by the concentrated solar patch. The temperature measured by the left thermocouple is roughly equal to that of the right thermocouple, and is equal to a reference temperature. The temperature is therefore located on straight line I. In this case the temperature of the metal structure is generally between 50° C. and 200° C. for a heat transfer fluid at approximately 300° C.

If the heat transfer fluid is oil, the normal temperature of the metal structure is between 50° C. and 250° C.; if the heat transfer fluid is steam, the normal temperature of the metal structure is between 50° C. and 350° C. The normal operating temperature varies along the receiver. Indeed, at the input, when the heat transfer fluid is "cold" the temperature of the receiver, and therefore of the metal structure which is heated by conduction, is less than that at the output of the receiver, where the heat transfer fluid is at its highest temperature.

In FIG. 3B the solar flux is not correctly aligned and illuminates the left side of the receiver more; the solar patch therefore covers only a portion of the absorber, and a portion of the metal structure, and heats a portion of left angle 9. The temperature measured by left thermocouples G3 and G4 is consequently higher than that measured by right thermocouples D3 and D4, and the latter is lower than the reference temperature.

The temperature of the left angle may be viewed in curve II.

In FIG. 3 the case of a diffuse solar flux is represented; area ZF covers both the absorber and at least a portion of the right and left angles. The dispersion of the flux may be due, for example, to soiling on the mirrors causing the appearance of a diffusion cone.

The temperature may then be read in curve II of FIG. 4; it is lower than the temperature in the case of FIG. 3B, where only one of the angles is illuminated.

Curves I', II', III' of T2 show the temperature of the heat transfer fluid as a function of the temperatures of the different portions of the receiver, corresponding to curves I, II, III. The highest heat transfer fluid temperature at the output is obtained when the flux is correctly aligned and/or focused. The lowest temperature corresponds to the case in which the flux is illuminating one or other of the angles and partially the absorber. If the flux is slightly diffuse the temperature reached is an intermediate one. Curve III" shows the temperature of the heat transfer fluid in the case of substantial diffusion of the concentrated solar flux; it is observed that the latter has values lower than those of curve II'.

In the case of FIG. 3B the solar patch partly illuminates the absorber, but a case may be envisaged in which the mirror positioning fault would be such that the solar patch would illuminate only the left or right portion of the metal structure and would not illuminate the absorber at all.

When a fault is detected, and therefore heating of the metal structure, corrective and/or compensating measures may be implemented.

A positioning fault of the solar patch may be corrected by adding, in the control loop of the device which causes the mirrors to rotate, a correction function which makes allowance for local faults. In the event of a fault such as the one represented in FIG. 3B, a change of alignment of the group of mirrors concerned is ordered by controlling the group's actuators. The choice of the angle of rotation is determined in accordance with the current angle of inclination and with the position of the sun.

A rotation of several tenths of degree may for example be ordered. After a certain period of time, for example several hours, or a day, the effect of the correction is checked. If the measured temperature difference is zero or less than a given value it is considered that the fault has disappeared. If a temperature difference greater than the threshold value is still detected a new adjustment is made.

If after several corrections the fault has not disappeared this means that the fault is due, for example, to a malfunctioning motor and/or to a broken mirror or a misadjusted mirror . . . . An operator goes to the site of the fault and then acts directly on the mirrors and/or on the actuators . . . .

In the event of focusing fault the operator generally takes action in the location on each mirror.

In addition, when the appearance of hot points is detected on the structure which might damage it, and when these hot points cannot be eliminated despite the implementation of corrective measures, protective measures are taken at the locations in question to protect the metal structure. For example, screens may be installed, which are interposed between the metal structure and the mirrors set apart from the metal structure; at this point the screen is illuminated and heated, and no longer the metal structure, or then there may be reflective surfaces on the metal structure which reflect the optical flux and reduce the heating of the metal structure.

Monitoring of the receiver is very simple since it uses the appearance of a temperature difference relative to the reference temperature.

The threshold temperature difference over which it is considered that there is a fault is equal, for example, to 10° C.

By virtue of the invention real-time monitoring of changes in the quality of focusing is possible. If certain mirrors are deformed or poorly focused the problem in the solar array is located easily and rapidly, and a local focusing problem may be identified among several kilometers of receivers. The maintenance and/or adjustment operations are then targeted, and this results in increased efficiency and substantial time savings in terms of maintenance and/or adjustment. This leads to a gain in terms of the power station's efficiency, since any loss of solar flux may be rapidly corrected.

Advantageously, and if the temperature of the structure is indeed measured, after a certain operating time of the solar power station, for example several months, "learning" of the measured temperatures may be incorporated into the monitoring system. This system is associated with an alert device which is activated when, in the case of a given solar flux, temperatures are measured which are very different from those obtained during a previous day having a solar flux roughly equivalent to the solar flux in question.

The invention has been described in the case of a receiver having a given structure; however the present invention applies to all receivers comprising an absorber and a metal structure extending longitudinally either side of the absorber. For example, the cavity could be circular in shape, and the angle of the metal structure could surround the cavity; the thermocouples would then be positioned on the angle in a diametrically opposite manner.

As a variant, temperature difference detection means of the binary type could be used. Below the threshold the detection means are in a first state, and above the threshold they are in a second state. For example, the detection means could be of the bimetallic type, or formed by a material which changes from an insulating state to a conductive state according to the temperature. These detection means would then indicate whether the temperature difference is above or below the threshold.

The present invention principally applies to power stations of the Fresnel type, but it can also apply to solar towers.

The invention claimed is:

1. A receiver module for a solar power station, the receiver module comprising:
    an absorber module;
    a metal structure defining a cavity at a base of which the absorber module is housed, the cavity including an aperture configured to be aligned towards at least one mirror of the solar power station, the aperture being edged by at least one side portion of the metal structure;
    a detector positioned on the at least one side portion to detect at least one temperature difference between a reference temperature and a first point of the side portion, and a temperature difference between the reference temperature and a second point of the side portion, the first and second points of the side portion being opposite one another relative to a plane of symmetry of the cavity, wherein the receiver module having a longitudinal axis, and the cavity extends along the longitudinal axis, the metal structure comprising two side portions extending longitudinally on either side of the cavity, both measurement points being positioned on each of the side portions relative to the longitudinal axis.

2. A receiver module according to claim 1, in which the detector comprises at least two thermocouples, each of the at least two thermocouples being installed on the at least one side portion of the metal structure.

3. A receiver module according to claim 1, in which the detector is installed on the at least one side portion of the metal structure on a face opposite the face configured to be aligned to face the mirrors.

4. A receiver module according to claim 1, in which the absorber module comprises at least two pipes that are adjacent and which extend longitudinally.

5. A receiver module according to claim 1, having a longitudinal axis, and the cavity extends along the longitudinal axis, the metal structure comprising two side portions extending longitudinally on either side of the cavity, both measurement points being positioned on each of the side portions relative to the longitudinal axis,
    the receiver module further comprising an internal metal plate folded to form the cavity of longitudinal axis, two angles, each attached to the side edges of the internal metal plate, forming the side portions, with at least two metal elements forming an arc of a circle attached to each of the longitudinal ends of the angles and surrounding the internal metal plate opposite the aperture of the cavity, and an external cover in a form of half-tube attached to the elements forming an arc of a circle.

6. A receiver comprising at least two receiver modules, each receiver module comprising:
    an absorber module;
    a metal structure defining a cavity at a base of which the absorber module is housed, the cavity including an aperture configured to be aligned towards at least one mirror of the solar power station, the aperture being edged by at least one side portion of the metal structure;
    a detector positioned on the at least one side portion to detect at least one temperature difference between a reference temperature and a first point of the side portion, and a temperature difference between the reference temperature and a second point of the side portion, the first and second points of the side portion being opposite one another relative to a plane of symmetry of the cavity, wherein the receiver module having a longitudinal axis, and the cavity extends along the longitudinal axis, the metal structure comprising two side portions extending longitudinally on either side of the cavity, both measurement points being positioned on each of the side portions relative to the longitudinal axis
    wherein, the receiver modules are placed end-to-end and connected to one another, and wherein the absorber modules are connected in a sealed fashion.

7. A receiver according to claim 6, in which the detector is distributed along an entire length of the receiver.

8. A solar power station comprising:
    at least one receiver comprising at least two receiver modules, each receiver module comprising:
    an absorber module;
    a metal structure defining a cavity at a base of which the absorber module is housed, the cavity including an aperture configured to be aligned towards at least one mirror of the solar power station, the aperture being edged by at least one side portion of the metal structure;
    a detector positioned on the at least one side portion to detect at least one temperature difference between a reference temperature and a first point of the side portion, and a temperature difference between the reference temperature and a second point of the side portion, the first and second points of the side portion being opposite one another relative to a plane of symmetry of the cavity, wherein the receiver module having a longitudinal axis, and the cavity extends along the longitudinal axis, the metal structure comprising two side portions extending longitudinally on either side of the cavity, both measurement points being positioned on each of the side portions relative to the longitudinal axis
    wherein, the receiver modules are placed end-to-end and connected to one another, and wherein the absorber modules are connected in a sealed fashion;
    a frame to suspend the at least one receiver;
    mirrors positioned under the receiver such that the mirrors reflect a solar flux on to the absorber, the mirrors configured to be aligned relative to the receiver;
    at least one actuator to move the mirrors; and
    one control unit for controlling the at least one actuator.

9. A solar power station according to claim 8, in which the receiver has a longitudinal axis and the mirrors are distributed in groups along the longitudinal axis, a same alignment being imposed on all the mirrors of a given group, and each group comprising at least one actuator controlled independently of the actuators of the other groups.

10. A solar power station according to claim 9, in which the receiver comprises as many detectors as there are groups of mirrors, wherein the detectors are positioned on the side portions of the metal structure at an interval that is staggered relative to that of the groups of mirrors.

11. A solar power station according to claim 9, in which, when a temperature difference is detected which is higher than a threshold value, for a given group of mirrors, the control unit determines, in accordance with an actual alignment of the mirror and of alignment of the sun at a time when the temperature difference is detected, a correction angle for the group of mirrors, and controls the at least one actuator of the group of mirrors to pivot through the determined correction angle, and then checks effect of the rotation on the temperature difference.

12. A method for monitoring a solar power station comprising:

at least one receiver comprising at least two receiver modules, each receiver module comprising:

an absorber module;

a metal structure defining a cavity at a base of which the absorber module is housed, the cavity including an aperture configured to be aligned towards at least one mirror of the solar power station, the aperture being edged by at least one side portion of the metal structure;

a detector positioned on the at least one side portion to detect at least one temperature difference between a reference temperature and a first point of the side portion, and a temperature difference between the reference temperature and a second point of the side portion, the first and second points of the side portion being opposite one another relative to a plane of symmetry of the cavity, wherein the receiver module having a longitudinal axis, and the cavity extends along the longitudinal axis, the metal structure comprising two side portions extending longitudinally on either side of the cavity, both measurement points being positioned on each of the side portions relative to the longitudinal axis wherein, the receiver modules are placed end-to-end and connected to one another, and wherein the absorber modules are connected in a sealed fashion;

a frame to suspend the at least one receiver;

mirrors positioned under the receiver such that the mirrors reflect a solar flux on to the absorber, the mirrors configured to be aligned relative to the receiver;

at least one actuator to move the mirrors; and one control unit for controlling the at least one actuator, wherein the method comprising:

a) measurement of temperature differences along a length of the receiver, and comparison with a threshold value;

b) when one or more temperature difference(s) is/are greater than the threshold value, determination of a correction angle for the mirror or mirrors concerned;

c) modification of an angle of alignment of the mirror or mirrors concerned in accordance with the calculated correction angle;

d) verification of effect of the modification;

e) if the temperature difference for one or more mirrors concerned is greater than the threshold value, b), c) and d) are repeated; otherwise a) is repeated.

13. A method according to claim 12, in which d) occurs plural hours or one day after c).

14. A method according to claim 12, in which, if after plural corrections the temperature difference is still greater than the threshold value, an individual action is taken on the mirrors and/or measures are taken to protect the solar power station relative to solar flux.

15. A method according to claim 14, in which the threshold value is equal to 10° C.

16. A receiver module according to claim 1, in which the first and second points are contained in a plane orthogonal to the longitudinal axis.

* * * * *